United States Patent [19]

Sasaki

[11] Patent Number: 5,745,629

[45] Date of Patent: Apr. 28, 1998

[54] OPTICAL DEVICE AND METHOD OF PRODUCING THE DEVICE

[76] Inventor: Keisuke Sasaki, 4-9, Minami-Shinozakicho 5-chome, Edogawa-ku, Tokyo, Japan

[21] Appl. No.: 750,424

[22] PCT Filed: Apr. 10, 1996

[86] PCT No.: PCT/JP96/00987

§ 371 Date: Dec. 11, 1996

§ 102(e) Date: Dec. 11, 1996

[87] PCT Pub. No.: WO96/32664

PCT Pub. Date: Oct. 17, 1996

[30] Foreign Application Priority Data

Apr. 11, 1995 [JP] Japan .................. 7-110069
Apr. 11, 1995 [JP] Japan .................. 7-110070
Jun. 23, 1995 [JP] Japan .................. 7-181142

[51] Int. Cl.[6] .................. G02B 6/10; G02F 1/35
[52] U.S. Cl. .................. 385/122; 359/332; 359/576
[58] Field of Search .................. 385/122; 359/326–332, 359/566, 569, 576

[56] References Cited

U.S. PATENT DOCUMENTS

| | | | |
|---|---|---|---|
| 4,243,398 | 1/1981 | Nomura et al. | 65/413 |
| 4,913,844 | 4/1990 | Demartino | 252/582 |
| 5,119,228 | 6/1992 | Fang | 359/328 X |
| 5,217,792 | 6/1993 | Chidsey et al. | 359/328 X |
| 5,289,308 | 2/1994 | Horsthuis et al. | 359/328 |

FOREIGN PATENT DOCUMENTS

| | | |
|---|---|---|
| 54-116948 | 9/1979 | Japan . |
| 59-192225 | 10/1984 | Japan . |
| 61-186942 | 8/1986 | Japan . |
| 63-188121 | 8/1988 | Japan . |
| 2-3403 | 1/1990 | Japan . |
| 5-142599 | 6/1993 | Japan . |
| 5-313217 | 11/1993 | Japan . |
| 2 017 331 | 2/1979 | United Kingdom . |

*Primary Examiner*—John D. Lee
*Attorney, Agent, or Firm*—Lowe, Price, LeBlanc & Becker

[57] ABSTRACT

A method for producing a waveguide for an nonlinear optical device is disclosed. The organic nonlinear optical material 1 is composed of a polymer having the second order nonlinear optical dye moieties substituted for the side chains of the polymer, each end of the optical dye moieties being grafted to the polymer. The optical material 1 is rolled and drawn by rolling rolls 2a, 2b and drawing rolls 4a, 4b, whereby a polymer film 3 is continuously formed, in which the optical dye moieties are oriented in a predetermined direction. Then the resultant polymer films are laminated to be a polymer laminate in which the orientations of the dye moieties are alternately inverted. The polymer laminate is cut in a predetermined direction with a predetermined thickness into a waveguide having a periodic domain structure with a predetermined submicron period or odd number times thereof.

17 Claims, 12 Drawing Sheets

5,745,629

OPTICAL DEVICE AND METHOD OF PRODUCING THE DEVICE

[TECHNICAL FIELD]

The present invention relates to an optical device having a multi-layer structure consisting of optical material films and a method of producing the device, and more specifically to a method of producing a waveguide for a nonlinear optical device having a periodically oriented structure and a grating having a periodic refractive index distribution, by use of film forming and film laminating of an optical material.

[BACKGROUND ART]

It is known that a quasi phase matching (QPM) method is useful for various electro-optical devices using nonlinear interactions of optical waves, such as a wavelength conversion device and the like. A QPM device is formed of a ferroelectric crystal such as $LiNbO_3$ or $LiTaO_3$, which is a nonlinear optical material. In the QPM device, a periodic domain structure having periodic inversion of the sign of the nonlinear coefficient is introduced. To introduce the periodic domain structure in the ferroelectric crystal, a method of applying an electric field or irradiating an electron beam is used.

However, the ferroelectric crystal is expensive, and it is difficult to machine the ferroelectric crystal to have a fine structure. For these reasons, researches on organic nonlinear optical materials and optical devices using organic nonlinear materials have recently been active. To achieve an excellent nonlinear optical property for an organic optical device, for example, a polymer film having the second order nonlinear optical dye moieties is used. The polymer film is poled by applying an electric field at a predetermined temperature.

In details, a polymer film waveguide is formed on a substrate, for example, by a spin-coat method. The spin-coated polymer film is applied for an electric field at about glass transition temperature by corona-poling apparatus to have a periodic domain structure. This polymer film waveguide can be used for a second harmonic generation (SHG) device. For efficient wavelength conversion, it is definitely important to meet a phase matching condition in the waveguide.

However, it is not easy to form a periodic domain structure in a polymer film waveguide corresponding to a coherence length by electric field poling. Therefore, the efficiency of wavelength conversion is still small at present. The poled polymer film poled by the electric field has also such a problem that relaxation of aligned molecules occurs after fabrication.

On the other hand, recently, wide-band and low-loss optical fibers using organic polymer materials (hereinafter, these fibers will be described as plastic fibers) are manufactured. Various researches for applying plastic fibers to optical fiber communication networks are active. Since the low-loss wavelength range of the plastic optical fiber is, for example, 650 nm in a visible wavelength region, it is desired to develop optical devices such as an optical amplifier for a plastic optical fiber system in a visible wavelength region, a novel optical fiber oscillator and the like.

The fiber-type optical amplifier has many features such as it is able to amplify a light beam by light excitation with high efficiency and high gain in a wide band, and to reveal a good matching with a fiber system. For example, by use of a silica-based material, rare-earth doped fiber amplifiers, which exhibit optical amplifying properties in an infrared region, have been developed. However, optical fiber oscillators (i.e., lasers), or optical fiber amplifiers, which can be used in a visible wavelength region, still have not been utilized.

Some of fluorescent organic dyes, for example, rhodamine dye, can exhibit excellent optical amplification property in a visible region. Since plastic fibers have low glass transition temperatures, it is easy to incorporate the organic dye into the plastic fiber. Therefore, by incorporating organic dye which is conformable to a necessary wavelength region and have a large stimulated emission area, it is theoretically able to achieve high efficient optical oscillation and optical amplification in every range within a visible region.

[DISCLOSURE OF THE INVENTION]

An object of the present invention is to provide a waveguide for a nonlinear optical device with a periodic domain structure formed of a polymer laminate composed of an organic nonlinear optical material.

Another object of the present invention is to provide a method of producing a waveguide for a nonlinear optical device in which an orientation of dye molecules is performed in steps of film forming and film laminating of an organic nonlinear optical material, without applying an electric field, to have a periodic domain structure.

Further object of the present invention is to provide a method of producing a grating, which is useful for an optical fiber laser or an optical amplifier, formed by laminating optical material films.

The waveguide for the nonlinear optical device embodying the present invention comprises a periodic domain structure formed of a polymer laminate in which a plurality of polymer films are laminated, wherein each of the polymer films is formed of a rolled and drawn organic nonlinear optical material which is a polymer having a second order nonlinear optical dye moiety substituted for a side chain of the polymer, an end of the optical dye moiety being grafted to the polymer, the optical dye moiety being oriented in one direction by rolling and drawing the organic nonlinear optical material.

The method of producing the waveguide for the nonlinear optical device embodying the present invention comprises the steps of: rolling and drawing an organic nonlinear optical material to form a polymer film, the organic nonlinear optical material being a polymer having a second order nonlinear optical dye moiety substituted for a side chain of the polymer, an end of the optical dye moiety being grafted to the polymer, the optical dye moiety being oriented in one direction by rolling and drawing the organic nonlinear optical material; laminating the resultant polymer films to form a polymer laminate; and cutting the polymer laminate in a predetermined direction with a predetermined thickness into a waveguide having a periodic domain structure.

The method of producing the grating embodying the present invention comprises the steps of: rolling and drawing a transparent optical material, which has a refractive index distribution, in a direction perpendicular to the refractive index distribution, to form a film; laminating the resultant films to form a laminate; and cutting the laminate to form a grating having a periodic refractive index distribution.

In the present invention, the orientation of the optical dye moieties is achieved not by electric field poling, but by rolling and drawing the organic nonlinear optical material. When the organic nonlinear optical material is rolled and drawn to be a polymer film, the nonlinear optical dye moieties which are a part of side chains of the polymer are physically oriented by shearing stress applied during the rolling and drawing step. It is important for providing a well dye molecule-oriented polymer film to use such an organic nonlinear optical material as each end of the optical dye moieties is grafted to main chains of the polymer by spacers. By using such material, the dye moieties can be automatically aligned in the film forming step, without electric field applying or electron beam writing.

The molecular-oriented polymer film is laminated in such a manner that each direction of the molecule orientations is selected by a predetermined rule, whereby a waveguide for a nonlinear optical device having a periodic domain structure can be obtained.

Further, according to the method of producing a grating of the present invention, an optical fiber or raw material thereof is formed to be a film and then laminated, whereby a grating is formed having a periodic refractive index distribution. The grating reveals a wavelength selectivity in accordance with the refractive index distribution.

[BEST MODE OF CARRYING OUT THE INVENTION]

Figure 1:
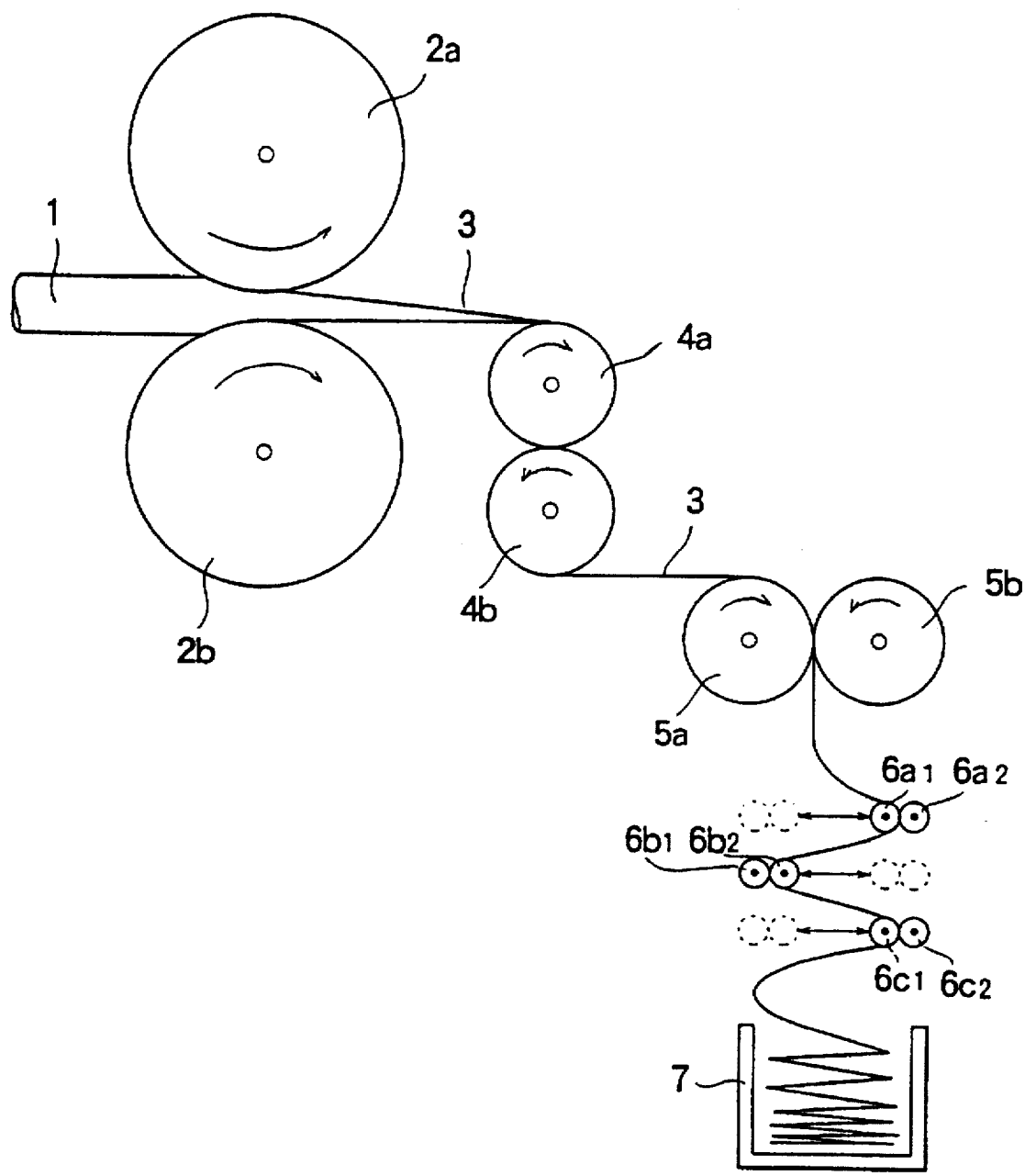
FIG. 1 shows a fabrication apparatus for fabricating a molecular-oriented polymer film according to an embodiment of the present invention.

Next, referring to the drawings, the embodiments of the present invention will be described.

FIG. 1 shows a fabrication apparatus and a process for fabricating a dye moiety oriented polymer film according to an embodiment of the present invention. The apparatus comprises a pair of rolling rolls 2a,2b for rolling an organic nonlinear optical material 1, a pair of drawing rolls 4a,4b for rolling and drawing the rolled polymer film 3, and a pair of extracting rolls 5a,5b for extracting the molecular-oriented polymer film in which dye moieties are aligned in the drawing step. The apparatus further comprises three pairs of folding rolls 6a(6a1, 6a2), 6b(6b1,6b2) and 6c(6c1,6c2) for folding up the extracted polymer film, which are driven in alternately reverse direction in parallel with each other as shown by arrows, and a container 7 for containing the rolled up oriented polymer film 3.

In this embodiment, Poly(MMA-co-DR1MA) is used as the organic nonlinear optical material 1, which is copolymer of dye molecule DR1MA and methylmethacrylate(MMA). This copolymer is useful for an SHG waveguide.

DR1MA is represented by the following formula;

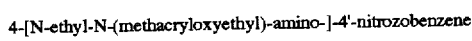

4-[N-ethyl-N-(methacryloxyethyl)-amino-]-4'-nitrozobenzene or

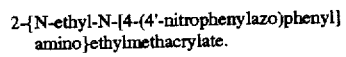

2-{N-ethyl-N-[4-(4'-nitrophenylazo)phenyl]amino}ethylmethacrylate.

Figure 2:
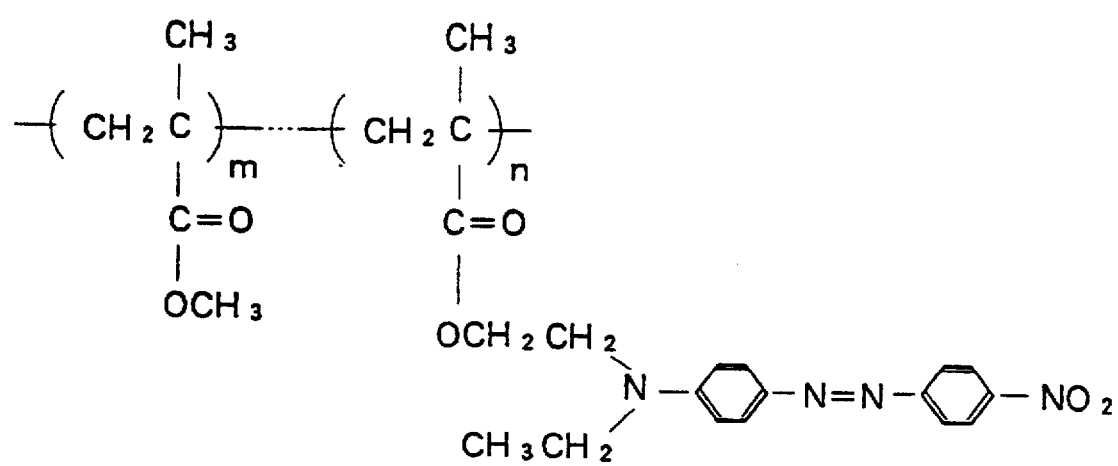
FIG. 2 shows a structure of an organic nonlinear optical material in the embodiment.

This optical material 1 is, as shown in FIG. 2, PMMA which a part of side chains thereof are replaced by DR1MA. Describing in detail, in the DR1MA substituted PMMA, DR1MA is grafted to PMMA in such a manner that each ethyl group at the end of the DR1MA serves as a spacer.

The organic nonlinear optical material 1 is, for example, a fiber or a film, which is formed by a normal thermoforming process, a wet process or a semi-dry process. Alternatively, a slab-shaped or a rod-shaped material can also be used for the optical material 1. To form a film of the organic nonlinear optical material 1, it is useful to use the same apparatus as the film forming apparatus 1 shown in FIG. 1 in such a condition that due molecules may not be oriented.

The nonlinear optical material 1 is rolled and drawn at approximately the glass transition temperature, preferably in the range between 100°-120° C. During this process, shearing stress is applied to the nonlinear material 1, thereby the dye molecules can be physically oriented in a direction. The molecular-oriented polymer film 3 is preferably drawn through multi-stage rolls, whereby the orientation can be accelerated, and the film 3 becomes to be submicron thick.

Figure 3A:
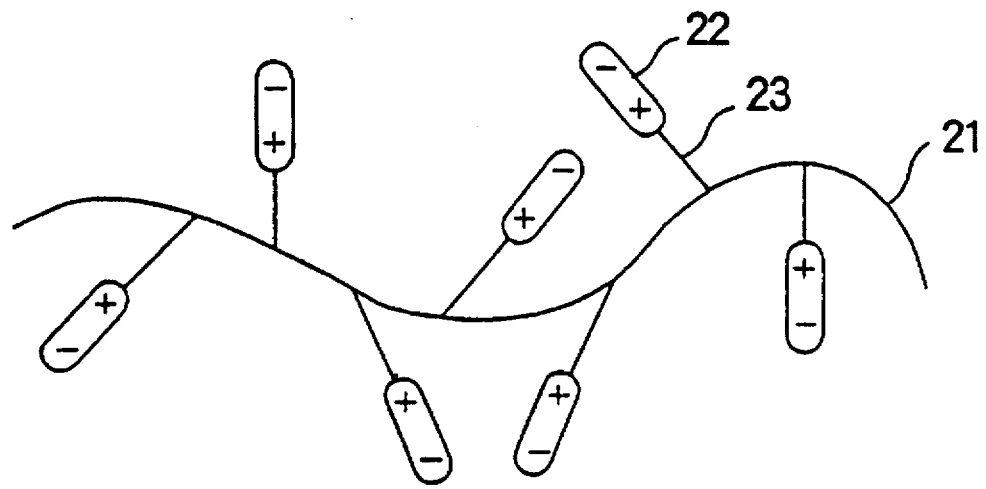
FIGS. 3A and 3B show a situation of the orientation process according to the embodiment.
Figure 3B:
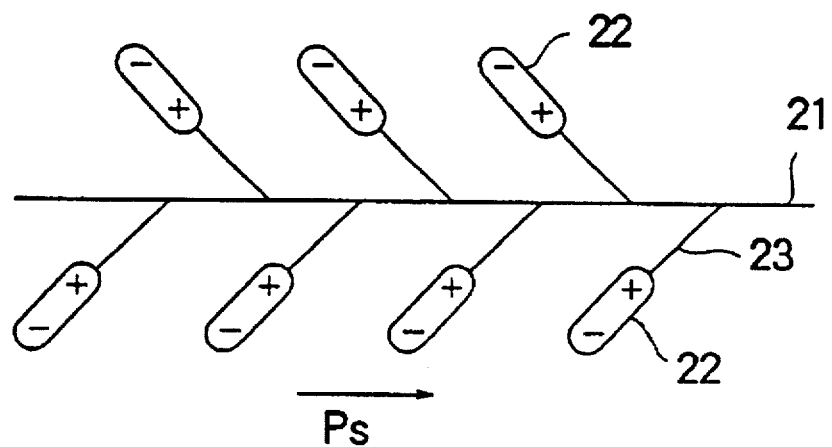

FIGS. 3A and 3B show a situation model in the above-described rolling and drawing step. As shown in FIG. 3A, a plurality of dye molecules (moieties) 22 are connected with the normal chain 21 of the polymer through spacers 23. The dye moieties 22 have spontaneous polarization, and are grafted to the main chain 21 in such a manner that the dye moieties 22 face in random directions. In this embodiment, the spacer 23 is supplied from each end of the dye molecules 22 as above described. As shown in FIG. 3B, the main chain 21 and the side chain dye moieties 22 are stretched in a direction by the rolling and drawing, whereby a large polarization Ps can be exhibited in parallel with the main surface of the film 3, as shown by an arrow.

In order to orient a lot of the dye moieties 22 in approximately parallel with the main chain 21, it is important that the polymer is such a type that each end of the dye moieties 22 is grafted to PMMA as described above.

Figure 17A:
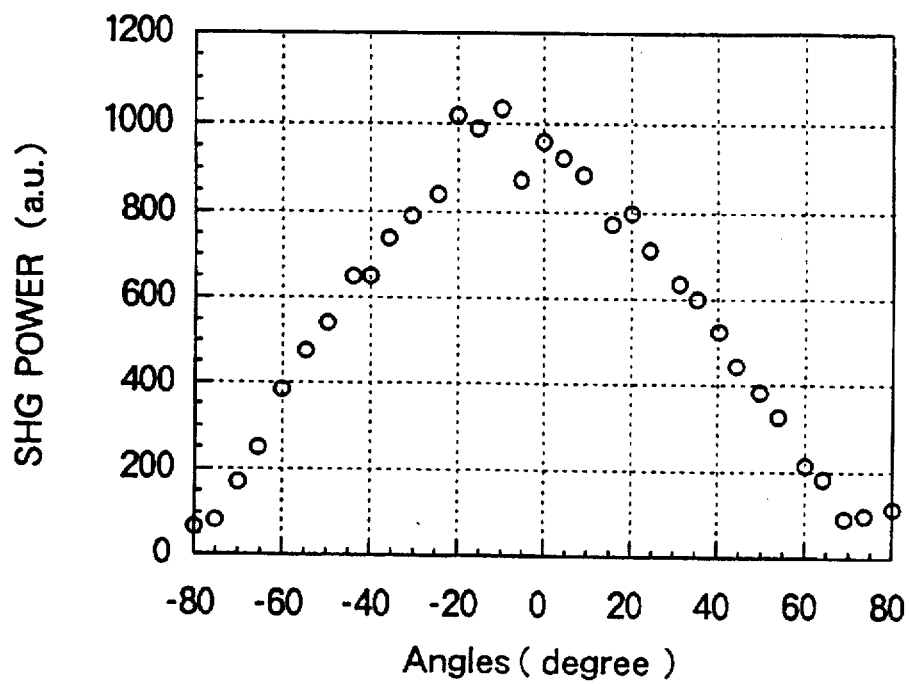
FIGS. 17A and 17B show SHG power characteristics of the polymer film, in which dye molecules are oriented in horizontal direction, measured by Maker-fringe method.

FIG. 17A shows an SHG power property measured by Maker-fringe method for the polymer film sample experimentally formed by the above-mentioned orientation process with rolling and drawing. This film sample was formed of Poly(MMA-co-DR1MA) including 5 wt % DR1MA. About 10 μm thick film was rolled and drawn at 120° C., and reduced to be about 7 μm thick. As shown in FIG. 17A, the SHG power has a maximum value at 0° based on the nonlinear coefficient $d_{11}$. It is noticed that the orientation in parallel with the main surface has been achieved.

Figure 17B:
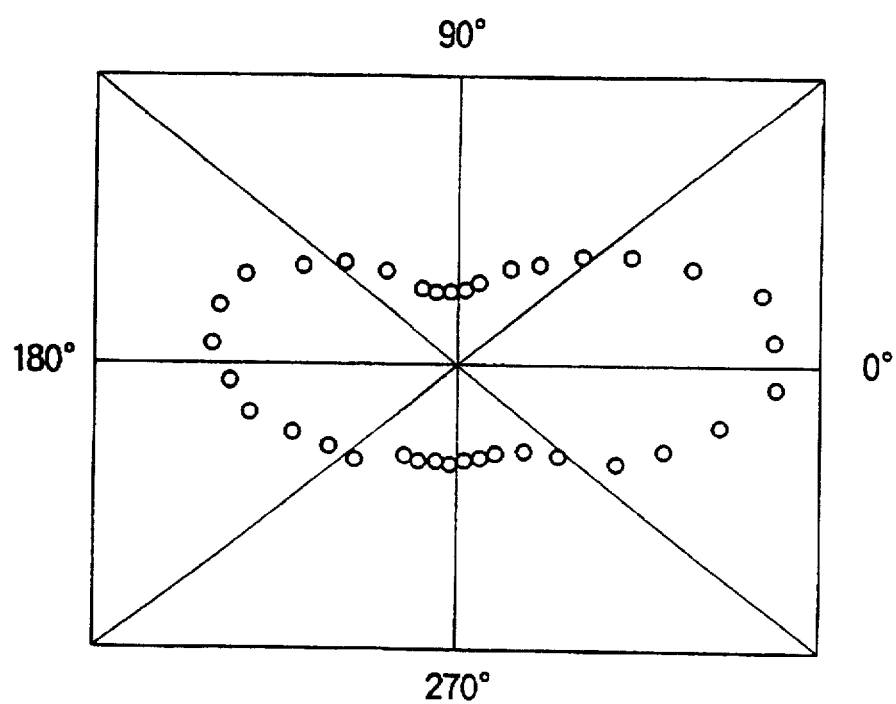

FIG. 17B shows an SHG power property for the same polymer film sample on a polar coordinate. The property was measured by rotating the film sample around an axis perpendicular to a main surface thereof. The direction of 0° in FIG. 17B is corresponding to the rolling and drawing direction.

According to our experiments, the degree of the dye moiety orientation can be controlled, for example, by driving the rolls 2A and 2B with different speed from each other, and by individually controlling the film heating temperatures by the rolls 2A and 2B. If the glass transition temperature of the nonlinear optical material 1 is near the disintegration temperature, it is difficult to roll and draw the material 1. In this case, it is useful to introduce a predetermined additive into the optical material 1 to reduce the glass transition temperature. As the above-described additive, a material which serves as a solvent for the nonlinear optical material, polymer with a low glass transition temperature and a high compatibility with the nonlinear optical material, and the like can be used. When a solvent is used, the solvent remained in the film can be removed by heating the film in a vacuum after the orientation process.

Figure 18:
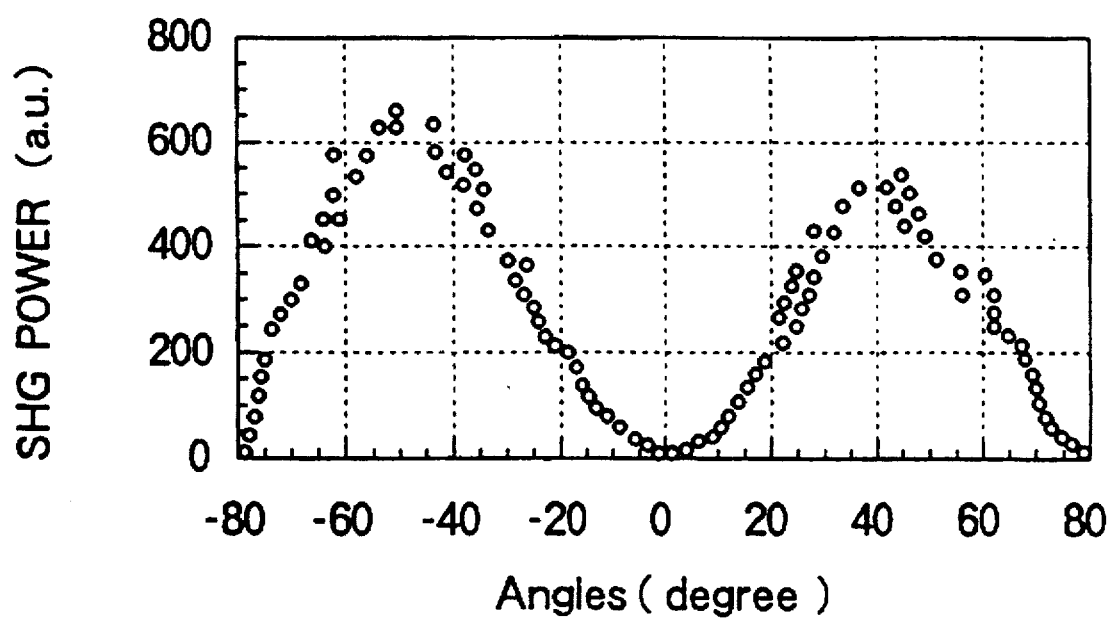
FIG. 18 shows an SHG power characteristic of the polymer film, in which dye moieties are oriented in vertical direction, measured by Maker-fringe method.

According to another experiment, it is noticed that the dye molecules could be oriented in perpendicular to the main surface of the film in another condition of the rolling and drawing different from the above-described experiment. For obtaining such a perpendicular orientation of the molecules, it is noticed that it is desirable to perform the rolling and drawing step at a temperature lower than that in the above-described experiment. FIG. 18 shows an SHG power property for a polymer film sample which is formed in such a condition that the optical material is rolled and drawn at 90° C. or below. In FIG. 18, the SHG power has a minimum value at 0° based on the nonlinear coefficient $d_{33}$. It is noticed that the orientation in perpendicular to the main surface has been achieved.

The relaxation of aligned molecules in the dye molecule oriented polymer film according to the above embodiment is smaller than that of conventional devices oriented by a corona-poling method. This is because that the main chains of the polymer are also stretched to be aligned in a linear direction, thereby reducing the free space for rotating the dye moieties.

Figure 4:
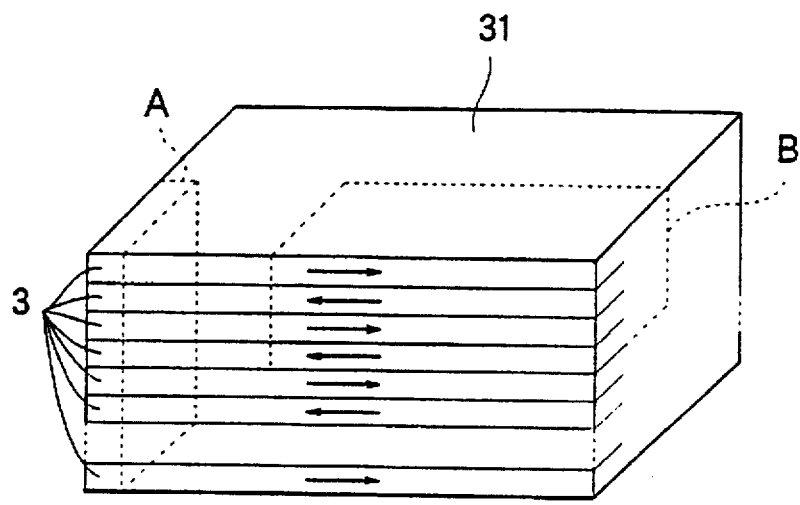
FIG. 4 shows a polymer laminate obtained by the embodiment.

An example such as the polymer film is molecularly oriented in parallel with the main surface will be described hereinafter. The polymer film 3, in which the dye moieties are oriented as described above, are continuously drained and repeatedly folded up with a predetermined length to be contained in the container 7. The contained polymer film is press bonded integrally to be a polymer laminate. FIG. 4 shows a polymer laminate 31 obtained by the above-described process. As shown by arrows, the polymer laminate 31 has a periodically oriented structure which has alternately inverted polarizations arranged in the lamination direction. This is a result of that each layer of the polymer films 3 is folded up with alternately inverting the upper and lower surfaces.

A desirable waveguide can be obtained by cutting out of the polymer laminate 31 having the periodically oriented structure with predetermined thickness and size.

Figures 5A, 5B:
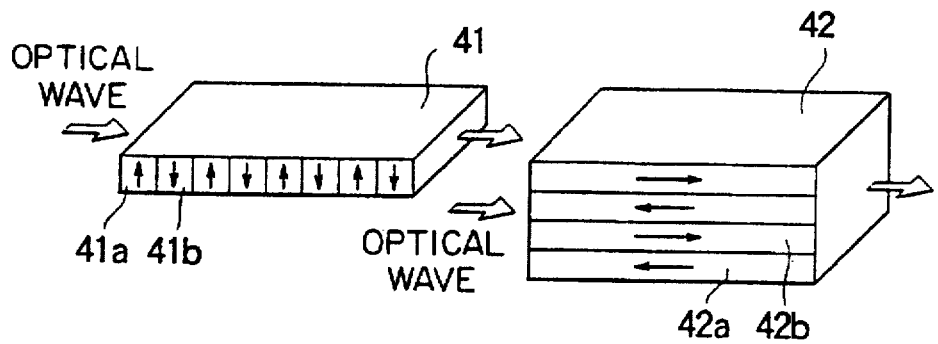
FIGS. 5A and 5B show film waveguides cut out of the polymer laminate shown in FIG. 4.

FIGS. 5A and 5B show a film waveguide 41 for an SHG device and a film waveguide 42 for an electro-optical device, respectively. The film waveguide 41 for the SHG device is, as shown by dot line A in FIG. 4, cut out of the polymer laminate 31 in such a manner that the lamination direction of the laminate 31 is adapted to be the propagation direction. As a result, the waveguide 41 has a bidirectional periodic domain structure (i.e., periodic domain inverted structure) in which up-domains 41a and down-domains 41b are alternately arranged with a predetermined pitch in the propagation direction. The film waveguide 42 for the electro-optical device is, as shown by dot line B in FIG. 4, cut out of the polymer laminate 31 in such a manner that the orientation of the dye molecules is adapted to be the propagation direction of the waveguide. As a result, the waveguide 42 has a bidirectional periodic domain structure in which alternately inverted domains 42a and 42b are arranged in the lamination direction perpendicular to the propagation direction.

Figure 6:
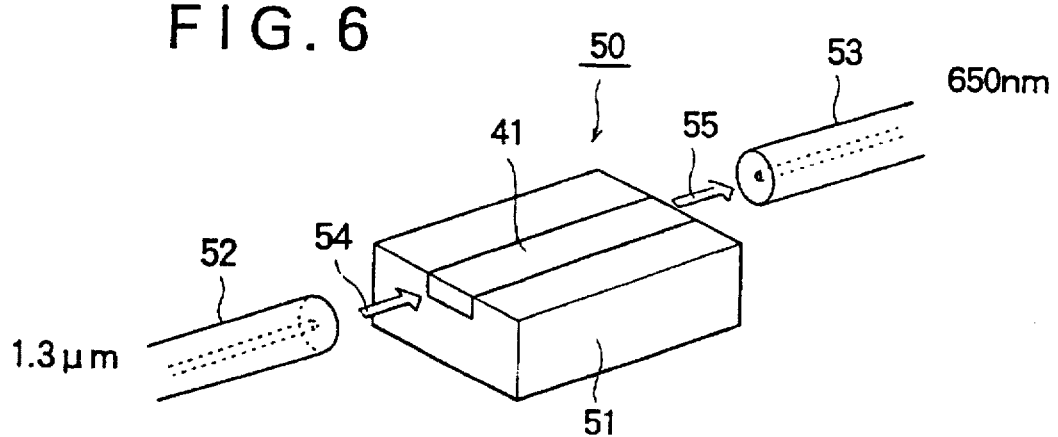
FIG. 6 shows an SHG device using the waveguide shown in FIG. 5A.

FIG. 6 shows an SHG device 50 using the waveguide 41 shown in FIG. 4A. The waveguide 41 is mounted on a substrate 51. This SHG device is, for example, used for such an application as one that converts the wavelength of optical data in a optical communication system having a silica-based fiber network to supply the converted data to users. An optical data 54, whose wavelength is 1.3 μm or 1.55 μm, is propagated through a silica-based fiber 52 in trunk lines to be input to the SHG device 50. The optical data 54 is wavelength-converted in the SHG device 50. As a result, a short-wavelength optical signal 55 of 650 nm or 780 nm can be output. The output optical signal 55 is amplified by an optical fiber amplifier (not shown) and divided by a dividing device (not shown) to be transmitted through an optical fiber 53 to a user's circuit. A graded index type polymer optical fiber (GIPOF), which is low-priced and has a wide transmission band, is preferable for the optical fiber 53.

The SHG device 50 shown in FIG. 6 can be used for not only wavelength conversion in the above-described fiber system, but also a wavelength conversion device in a laser printer or a CD pick-up using red, blue or green light.

Figure 7:
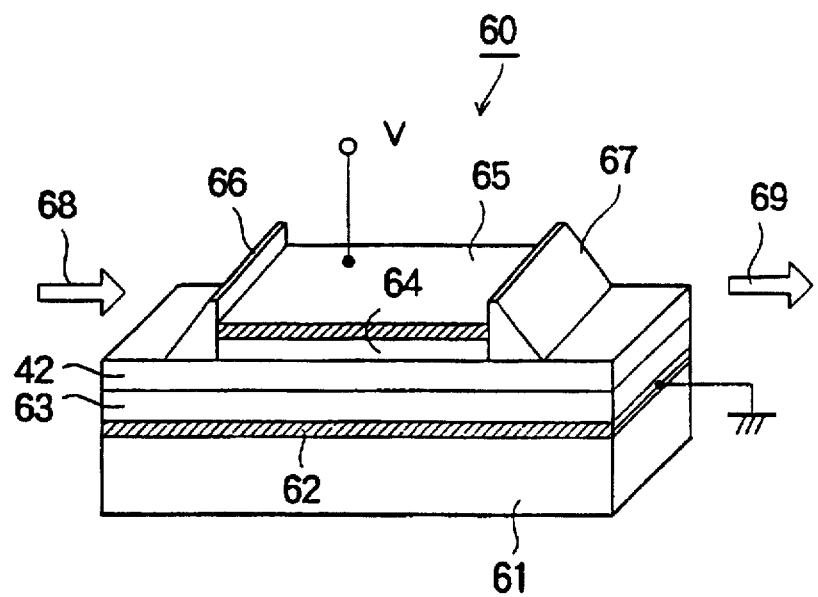
FIG. 7 shows an electro-optical device using the waveguide shown in FIG. 5B.

FIG. 7 shows an electro-optical device 60 using the film waveguide 42 shown in FIG. 5B. A lower-side electrode 62, a lower-side buffer layer 63 and the film waveguide 42 are sequentially mounted on a substrate 61. On the waveguide 42, an upper-side buffer layer 64 and an upper-side electrode 65 are sequentially mounted. Prisms 66 and 67 are disposed on the input and output terminals of the waveguide 42, respectively. This device 60 is useful for a multi-mode electro-optical modulating device which is used, for example, for transmitting the short-wavelength optical signal in the above-mentioned user's GIPOF system. By applying a high-frequency electric signal on the upper-side electrode 65, an input optical signal 68 can be modulated to be output as a modulated optical signal 69. Alternatively, the device 60 can be used for such an optical switch as one that ON/OFF switches an optical wave.

Figure 8:
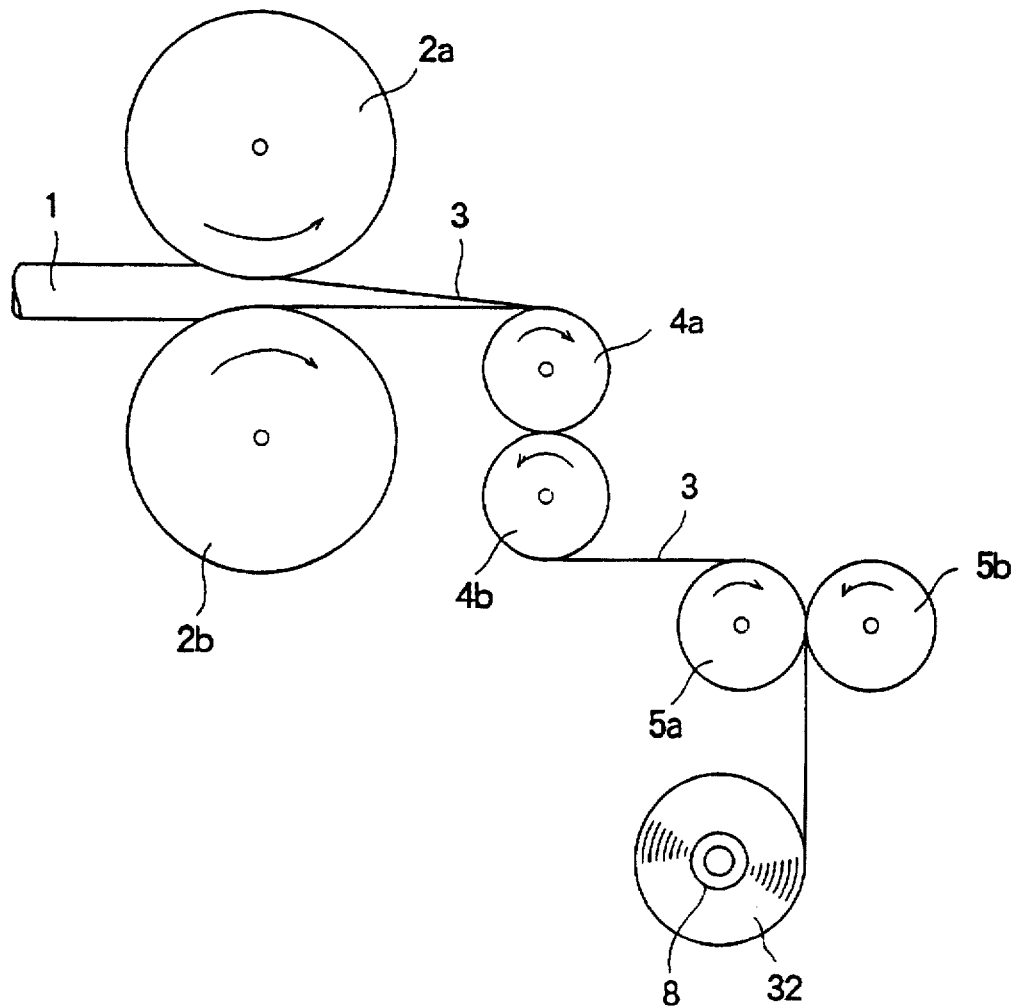
FIG. 8 shows a fabrication apparatus for fabricating a molecular-oriented polymer film according to another embodiment.

FIG. 8 shows a fabrication apparatus according to another embodiment. In this embodiment, the oriented polymer film 3 is rolled up on a take up drum 8 to be a polymer laminate 32. In the polymer laminate 32, unlike the case of FIG. 1, there is no inversion of the orientation along the lamination direction. The plural layers in the polymer laminate 32 are successively laminated with a uniform orientation.

Figure 9:
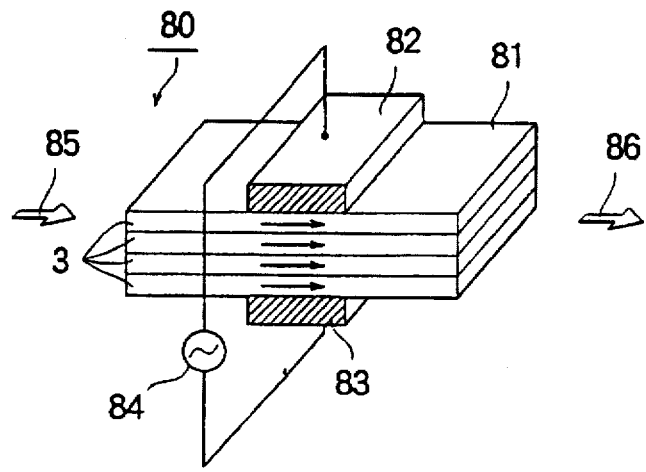
FIG. 9 shows an electro-optical device using a polymer laminate of the polymer film formed by the apparatus shown in FIG. 8.

FIG. 9 shows an electro-optical device 80 using a bulk 81. The bulk 81 is cut out of the polymer laminate 32 obtained by the apparatus of FIG. 8, in such a manner that the orientation of the dye molecules is adapted to be in a propagation direction, and to have a predetermined thickness. As shown by arrows in the drawing, the bulk 81 has a unidirectional periodic domain structure in which the domains arranged in the lamination direction are uniformly oriented. Electrodes 82 and 83 are formed on upper and lower sides of the bulk 81, respectively. By applying a high-frequency power 84 (or switching power) between the electrodes 82 and 83, an input optical signal 85 input in perpendicular to the electric field can be modulated by Pockels effect to output a modulated optical signal 86. Alternatively, the input signal 85 can be switched.

The bulk 81 can be formed as a submicron film waveguide mounted on a predetermined substrate, similar to the embodiment of FIG. 7.

In the embodiment of FIG. 1 and FIG. 8, the drawn and oriented polymer film 3 is continuously extracted to be folded up or rolled up. Unlike the described embodiment, it is also useful to successively cut the oriented polymer film 3 into plural pieces each of which has a predetermined length, and stack the pieces to obtain a polymer laminate. In this method, the cut out pieces can be laminated with the respective directions optionally selected.

Figure 10:
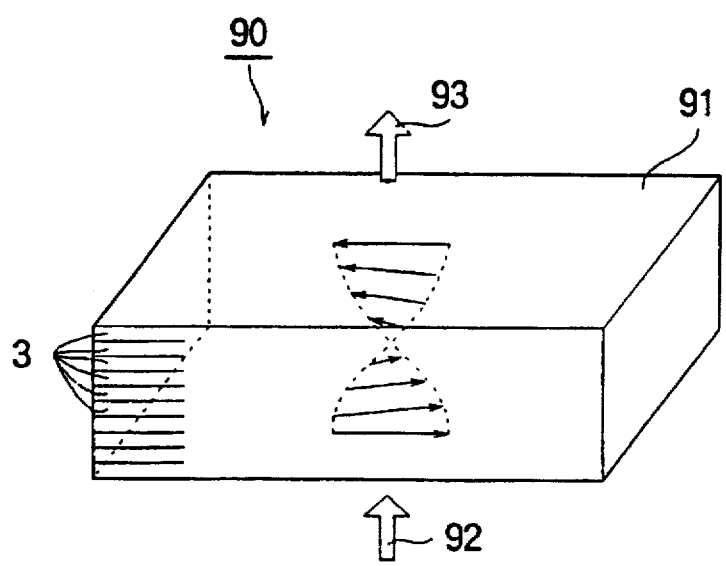
FIG. 10 shows a optical isolator according to another embodiment.

FIG. 10 shows an optical isolator 90 having a polymer laminate 91 in which cut out pieces of the polymer film 3 are rotated little by little for the orientation to be laminated. By preparing such a spiral type rotation for the orientation along the thickness direction, a plane of polarization of an optical wave 92 transmitted through the isolator 90 in the thickness direction is rotated, thereby an optical wave 93 with a predetermined plane of polarization can be output.

Figure 11:
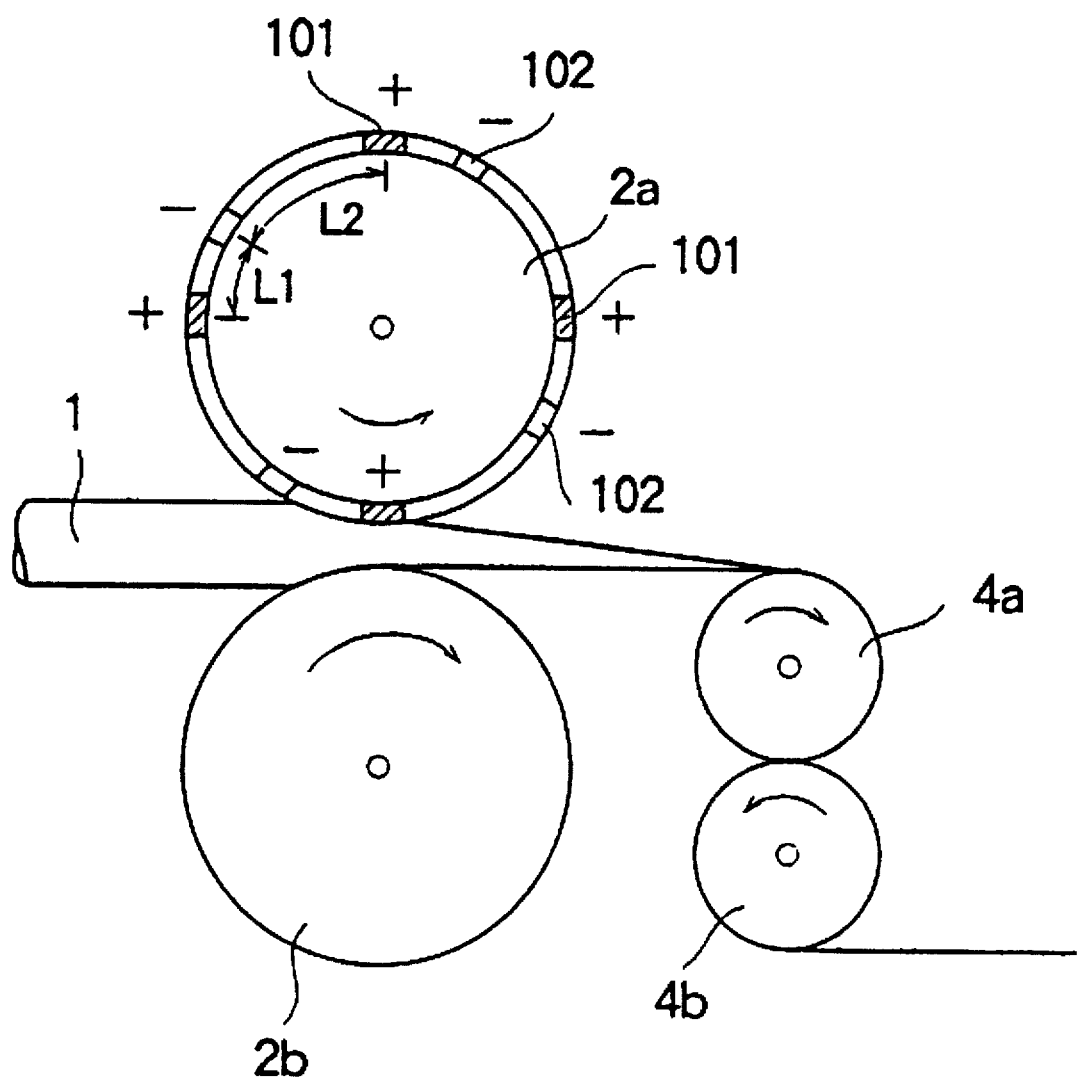
FIG. 11 shows a fabrication apparatus for fabricating a molecular-oriented polymer film according to another embodiment.

FIG. 11 shows an apparatus according to another embodiment. In this embodiment, pairs of positive-side electrodes 101 and negative-side electrodes 102 are disposed around one roll 2a of the pair of rolls 2a,2b with a predetermined pitch. The apparatus shown in FIG. 11 includes four pairs of electrodes 101,102. It is necessary to set the length L2 between each pair of the electrodes larger than the length L1 between the positive-side electrode 101 and the negative-side electrode 102 in the respective pairs. By selecting such a condition, a large electric field is formed between the positive-side electrode 101 and the negative-side electrode 102 in the respective pairs, and a negligible small electric field is formed between each pair of electrodes. In this apparatus, during the rolling and drawing, an electric field with a predetermined polarity is periodically applied to the organic nonlinear optical material 1 in the drawing direction, thereby the molecular orientation of the polymer film 3 can be accelerated. However, the electric field is used as an auxiliary method.

In the above-described embodiments, the oriented polymer film is formed by only one step of rolling and drawing, thereafter formed to be a polymer laminate. However, it is useful to use such a feedback step as to repeatedly feed the oriented polymer film, in which the optical dye molecules are oriented, to the rolling and drawing step to reduce the thickness. Alternatively, it is also useful to use such a feedback step as one that repeatedly feeds the polymer laminate, in which the optical dye molecules are oriented, to the rolling and drawing step to reduce the thickness. By using these methods, a waveguide with a small period of orientation can be obtained.

In the above-described embodiments, the dye molecules are oriented in the rolling and drawing step. However, it is also useful to use such a preliminary step as to orient the dye molecules by applying a shearing stress in a spinning or film forming step prior to the rolling and drawing step.

In the embodiment shown in FIG. 11, since the periodic electric field is applied to the material, the resultant oriented polymer film has periodically highly-oriented portions. Therefore, it is useful to select only the highly-oriented portions to laminate. As a result, the polymer laminate can be formed, in which the molecules are highly-oriented and the oriented molecules are uniformly distributed.

Figure 12:
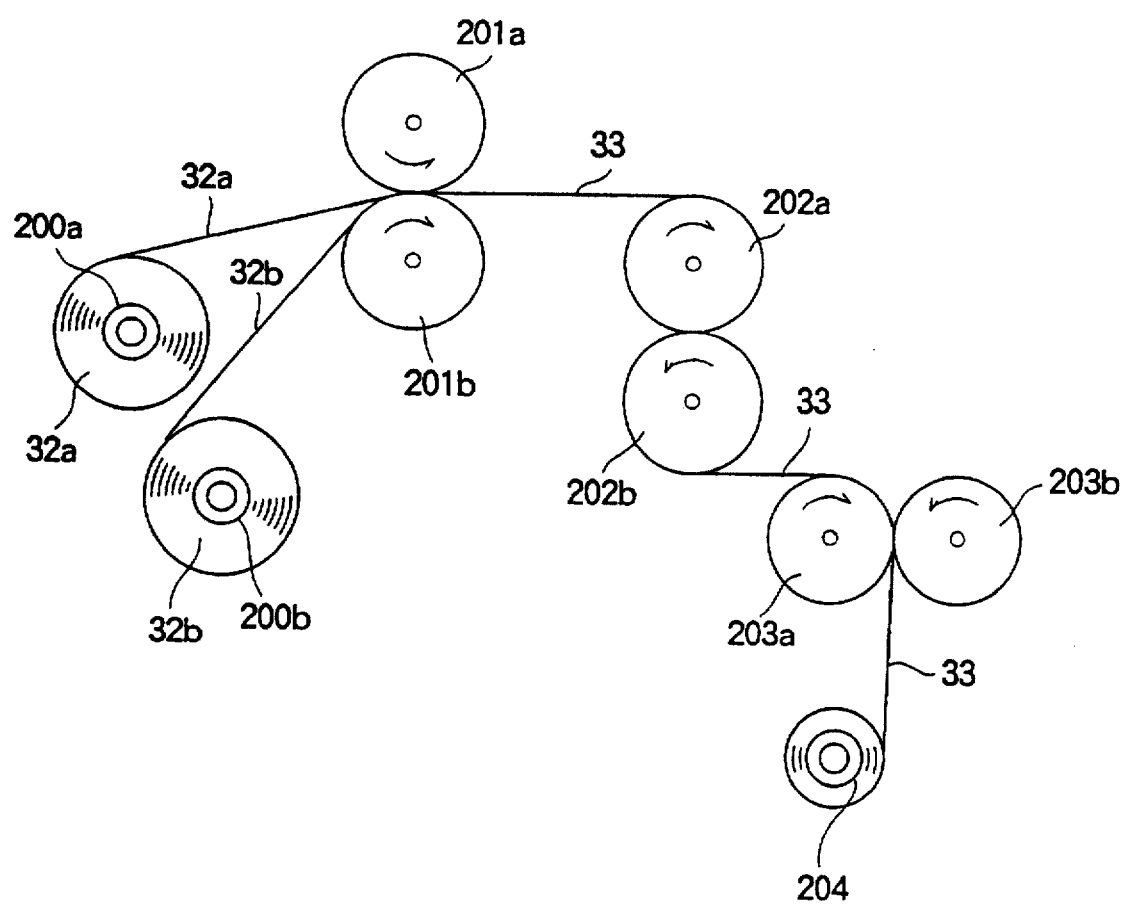
FIG. 12 shows a film laminating apparatus according to another embodiment.

FIG. 12 shows a polymer film laminating apparatus according to another embodiment. In the above-described embodiment using the apparatus shown in FIG. 8, the rolling and drawing step for rolling and drawing the organic optical material 1 and the successive laminating step are continuously performed. As a result, polymer laminate has a uniform orientation in every layer. Contrary, in this embodiment, the apparatus shown in FIG. 8 is used only for rolling and drawing. By combining the apparatus shown in FIG. 8 and the film laminating apparatus shown in FIG. 12, it is able to form a polymer laminate which has optionally combined orientations. In this case, it is necessary to roll up a cooled polymer film on the take up drum 8 in the apparatus of FIG. 8.

Referring to FIG. 12, the oriented polymer films 32a and 32b, which were rolled up by the apparatus shown in FIG. 8, are installed on two supply drums 200a and 200b. One of the polymer films 32a and 32b is as rolled up by the apparatus shown in FIG. 8, and the other is a rewinded polymer film. Therefore, the oriented polymer films 32a and 32b supplied from the drums 200a and 200b have reverse dye molecule orientations to each other. These polymer films 32a and 32b are passed through and pressed by a pair of press rolls 201a and 201b to be integrally bonded, whereby an oriented polymer film 33 is obtained. In this case, it is desirable to heat the press rolls 201a, 201b, or prepare another heater to accelerate the bonding between the oriented polymer films 32a and 32b. The oriented polymer films 32a, 32b are passed through a pair of rolls 202a, 202b, and successively passed through a pair of rolls 203a, 203b to be rolled up on a take up drum 204. At the pairs of rolls 202a, 202b and 203a, 203b, the oriented polymer film 33 is cooled. In order to prevent orientation relaxation of the polymer film 33, it is preferable to roll up the polymer film 33 in a tension state.

In this way, on the take up drum 204, an oriented polymer film, in which two oriented polymer films are integrally stacked, can be rolled up. By supplying the resultant oriented polymer films to the laminating apparatus shown in FIG. 12 in consideration of the respective orientations, a polymer laminate in which four oriented polymer films are integrally stacked can be obtained. Furthermore, by repeating the same process, a polymer laminate having an optional number of stacked layers can be obtained.

In the present invention, unlike the laminating apparatus using the rolls as shown in FIG. 12, it is able to use a conventional laminating apparatus which press bonds a plurality of films on a plate.

The present invention is not limited to the above-described embodiments. Other appropriate polymers which can be used for the main chain of the nonlinear optical material include thermoplastic resin, polymer revealing a thermoplastic property in combination with a solvent or a plasticizer, PET, PC, polyamide, polyimide, polyurethane, polyester, polyesterimide, and the like. Nonlinear optical dye molecules include such as those generally represented by -D-($\pi$)-A and -A-($\pi$)-D (where, $\pi$ denotes $\pi$-conjugate portion, D denotes donor group, and A denotes acceptor group). The -D-(π)-A includes molecular ionic dye such as N-methyl pyridinium acid nonlinear optical dye, for example as follows;

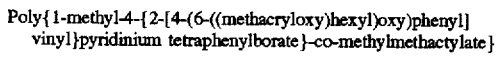

Poly{1-methyl-4-{2-[4-(6-((methacryloxy)hexyl)oxy)phenyl] vinyl}pyridinium tetraphenylborate}-co-methylmethactylate}

The spacers disposed between the polymer and the dye molecules include —$(CH_2)_n$—, —$(CH_2CH_2O)_n$—, —$(Pho)_n$—, —$COOCH_2CH_2$—, and the like.

As described above, according to the present invention, a film waveguide having a periodic domain structure can easily be obtained by the steps of rolling and drawing an organic nonlinear optical material without applying an electric field to form an oriented polymer film, and successively laminating the polymer film. Therefore, it will be appreciated that it is possible to achieve an excellent and low-priced nonlinear optical device such as a wavelength conversion device and the like.

Figure 13:
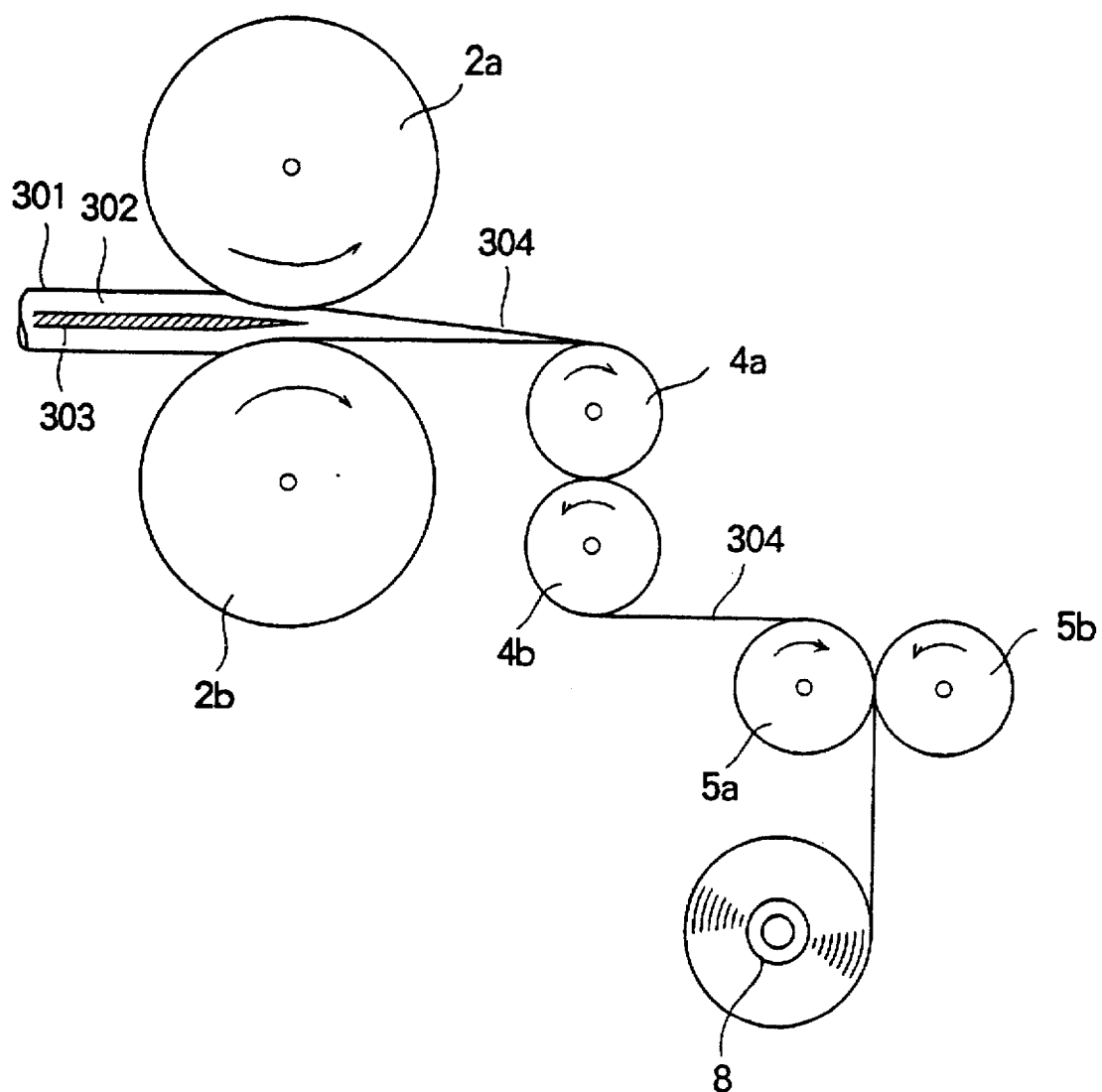
FIG. 13 shows an apparatus for fabricating a plastic film for a grating according to another embodiment of the present invention.

Next, referring to FIG. 13, a method for fabricating a grating according to the present invention will be described. The film forming apparatus shown in FIG. 13 is basically the same as that shown in FIG. 8. In this embodiment, a plastic fiber 301, in which organic dye is doped in the core portion 303, is used as a starting material. The plastic fiber 301 is, for example, formed as follows. First, an MMA(methyl methacrylate) monomer solution is prepared, which includes organic dye, low molecular weight compound for forming a refractive index distribution, accelerating agent for polymerization, chain transfer agent, and DMSO(dimethyl sulphoxide) for assisting the dye dissolution. The monomer solution is poured into a PMMA tube, then introduced in a drying apparatus with the tube. The tube is rotated at a temperature in the range of 90°–95° C., for about 24 hours in the drying apparatus, thereby polymer is formed. Thereafter, the tube is put under heat treatment at 110° C. under a reduced pressure condition of 1 mmHg for about 24 hours. The resultant material is drawn at a temperature in the range of 190°–250° C., whereby the plastic fiber 301 having the dye-doped core portion 303 and a transparent clad portion 302 can be obtained. As the organic dye, rhodamine B, rhodamine 6G and the like can be used.

In this embodiment, the plastic fiber formed by the above-described drawing process is used as a starting material. However, in practice, it is possible to use a rod-shaped material or a slab material which is not yet drawn. Furthermore, with respect to the refractive index distribution of the material, it is approved to use whichever step index (SI) type and graded index (GI) type.

The plastic optical fiber 301 is rolled and drawn by the apparatus shown in FIG. 13 at about 200° C., whereby a plastic film 304 can be continuously formed and rolled up on the take up drum 8.

Next, the rolled-up plastic film 304 is rewinded, laminated, and integrated by press bonding at a predetermined temperature so as to provide a plastic laminate. For example, by repeating press bonding steps in each of which two plastic films are press bonded by the apparatus shown in FIG. 12, the plastic laminate having an optional number of stacked layers can be obtained.

Figure 14:
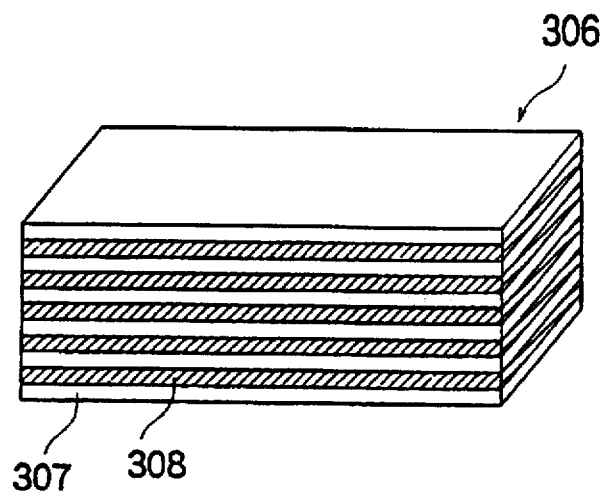
FIG. 14 shows a polymer laminate formed by the apparatus according to the embodiment.

FIG. 14 shows the resultant plastic laminate 306. The plastic laminate 306 has a periodic structure in which low refractive index layers 307 and high refractive index layers 308 are alternately aligned in the lamination direction, corresponding to the core portion 303 and the clad portion 302 in the plastic optical fiber 301 used as the material. Assuming that the thickness reduction of the laminate 306 during the press bonding step is small, the alignment period of the low refractive index layers 307 and the high refractive index layers 308 will become to be equal to the thickness of the plastic film 304, i.e., 0.3 to 0.5 μm. Since the organic dye is doped in the core portion 303, the laminate 306 has a periodic dye distribution corresponding to the refractive index distribution. It is preferable that the refractive index distribution is in a small range of 1.4–1.5. In this way, a distributed feedback (DFB) structure can be obtained, in which dye-doped active regions and non-doped passive regions are periodically aligned. Therefore, the laminate 306 has both a wavelength selectivity and an optical amplifying property so as to selectively amplify a pre determined wavelength light deter mined by the DFB structure and period thereof.

Figure 15:
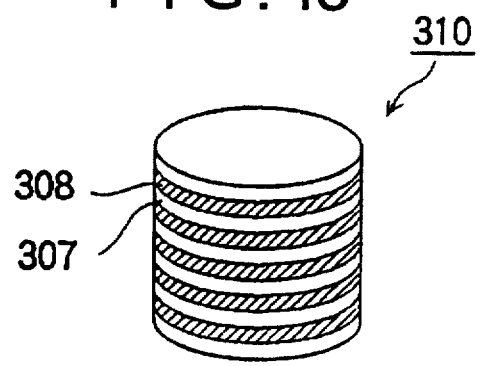
FIG. 15 shows a grating cut out of the polymer laminate.

As shown in FIG. 15, by cutting out of the laminate 306 having the above-described periodic structure of the refractive index distribution and the dye distribution to have a cylindrical shape, a grating 310 with the DFB structure can be obtained. For applying the grating 310 to an optical fiber amplifier, the grating 310 is formed to have the same diameter that of amplifying fibers.

Figure 16:
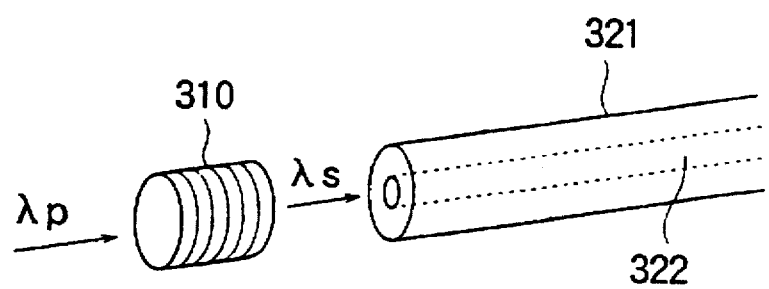
FIG. 16 shows an optical fiber amplifier using the grating shown in FIG. 15.

FIG. 16 shows an example of a plastic optical fiber amplifier using the grating 310. The amplifying fiber 321 is a plastic optical fiber in which organic dye is doped in the core portion 322 similar to the starting material of the grating 310. The grating 310 is disposed at the input end of the amplifying fiber 321.

In such a system, when a pumping light with a wavelength of $λp$ is input to the grating 310, a large signal light can be output by the wavelength selectivity and the laser amplifying operation with a predetermined wavelength of $λs$ in the grating 310. For example, assume that rhodamine B is used as the organic dye, and the second harmonic wave from a Nd:YAG laser ($λp$=532 nm) is used for the pumping light. Under this condition, a large signal light of $λs$=590 nm can be output. The output signal light of $λs$ from the grating is input to the amplifying fiber 321 to be further light amplified.

According to the embodiment, since the grating 310 having a light amplifying property is disposed at the input end of the amplifying fiber 321, it is possible to amplify a signal light having a predetermined wavelength by using a pumping light only. It is not necessary to use both a signal light and a pumping light. Further, comparing to the case without the grating 310, even if the amplifying fiber 321 is short, a large signal gain can be achieved.

In the above-described embodiment, a plastic optical fiber is used, which has a dye-doped core portion. However, it is approved to use such an optical fiber as that dye is doped in the clad portion. Additionally, a non-doped optical fiber may also be used in the present invention. In this case, a grating formed by the same process as the above-described embodiment has only a wavelength selectivity based on the refractive index distribution, without a light amplifying operation.

Furthermore, glass may be used for the transparent material instead of plastic. Using a glass fiber and the same method as that of the above-described embodiment, it is possible to form a grating. In this case, when an optical fiber which has a chelate-doped core portion is used, a grating having laser amplifying operation can be formed by the same method as that of the above-described embodiment.

In the above-described embodiment, the plastic film is continuously rolled up. Unlike the above-described embodiment, it is also useful to successively cut the plastic film into pieces each of which has a predetermined length, and integrally stack the pieces to obtain a laminate.

As described above, according to the present invention, a laminate having a periodic refractive index distribution in the lamination direction can be formed by the steps of rolling and drawing an optical fiber or material thereof to form a film, and successive laminating the film. A grating is easily formed of the laminate to have a wavelength selectivity determined by the refractive index distribution. Especially, when a plastic fiber is used, in which organic dye is doped in the core portion or the clad portion, a grating having a DFB structure can be obtained. Since the grating has both optical oscillating operation and optical amplifying operation, the grating is useful for an optical fiber laser, a fiber amplifier and the like.

I claim:

1. A waveguide for a nonlinear optical device, comprising a periodic domain structure formed of a polymer laminate in which a plurality of polymer films are laminated, wherein each of the polymer films is formed of a rolled and drawn organic nonlinear optical material which is a polymer having a second order nonlinear optical dye moiety substituted for a side chain of the polymer, an end of the optical dye moiety being grafted to the polymer, the optical dye moiety being oriented in one direction by rolling and drawing the organic nonlinear optical material.

2. The waveguide according to claim 1, wherein
the nonlinear optical device is a wavelength conversion device having a substrate and the waveguide mounted thereon,
the polymer laminate is formed in such a manner that the polymer films are laminated with alternately inverted orientations of the optical dye moieties, and
the waveguide is cut of the polymer laminate such that a lamination direction of the polymer laminate is adapted to be a propagation direction of the waveguide, to have a bidirectional periodic domain structure in which the domains arranged in the propagation direction are periodically inverted.

3. The waveguide according to claim 1, wherein
the nonlinear optical device is an electro-optical device for modulating an optical wave, having a substrate, the waveguide mounted thereon and apply means for applying an electric field to the waveguide perpendicular to a propagation direction of the waveguide,
the polymer laminate is formed in such a manner that the polymer films are laminated with a unidirectional orientation of the optical dye moiety, and
the waveguide is cut out of the polymer laminate such that the orientation of the dye moiety is adapted to be the propagation direction of the waveguide, to have a unidirectional periodic domain structure in which domains arranged in a lamination direction perpendicular to the propagation direction are uniformly oriented.

4. The waveguide according to claim 1, wherein
the nonlinear optical device is an electro-optical device for modulating an optical wave, having a substrate, the waveguide mounted thereon and apply means for applying an electric field to the waveguide,
the polymer laminate is formed in such a manner that the polymer films are laminated with alternately inverted orientations of the optical dye moieties, and
the waveguide is cut out of the polymer laminate such that the orientations of the optical dye moieties are adapted to be a propagation direction, to have a bidirectional periodic domain structure in which domains arranged in a lamination direction are periodically inverted.

5. A method for producing a waveguide for an nonlinear optical device, comprising the steps of:

rolling and drawing an organic nonlinear optical material to form a polymer film, the organic nonlinear optical material being a polymer having a second order nonlinear optical dye moiety substituted for a side chain of the polymer, an end of the optical dye moiety being grafted to the polymer, the optical dye moiety being oriented in one direction by rolling and drawing the organic nonlinear optical material;

laminating the resultant polymer film to form a polymer laminate; and cutting the polymer laminate in a predetermined direction with a predetermined thickness into a waveguide having a periodic domain structure.

6. The method according to claim 5, wherein the laminating step repeatedly folds up the polymer film with every predetermined length to form the polymer laminate.

7. The method according to claim 5, wherein the laminating step continuously rolls up the polymer film in which the optical dye moiety is oriented on a take up drum.

8. The method according to claim 5, further comprising a feedback step for feeding back the polymer film, in which the optical dye moiety is oriented, to the rolling and drawing step to reduce thickness thereof.

9. The method according to claim 5, wherein the laminating step is performed by rolling up the polymer film in which the optical dye moiety is oriented, and press-bonding plural of the polymer films with each other which are stacked in such a manner that each of the polymer films is arranged in a selected direction according to orientation of the optical dye moiety.

10. The method according to claim 9, wherein the laminating step is performed by repeatedly press-bonding two polymer films with each other in which the optical dye moiety is oriented, thereby providing the polymer laminate having a predetermined number of polymer films.

11. The method according to claim 5, wherein the rolling and drawing step includes applying an auxiliary electric field to the organic nonlinear optical material in a drawing direction to accelerate orientation.

12. The method according to claim 5, wherein
the nonlinear optical device is a second-harmonic generation device having a substrate and the waveguide mounted thereon,
the polymer laminate is formed in such a manner that the polymer films are laminated with alternately inverted orientations of the optical dye moieties, and
the waveguide is cut out of the polymer laminate such that a lamination direction of the polymer laminate is adapted to be a propagation direction of the waveguide, to have a bidirectional periodic domain structure in which domains arranged in the propagation direction are periodically inverted.

13. The method according to claim 5, wherein
the nonlinear optical device is an electro-optical device for modulating an optical wave, having a substrate, the waveguide mounted thereon and apply means for applying an electric field to the waveguide in a direction perpendicular to a propagation direction of the waveguide,
the polymer laminate is formed in such a manner that the polymer films are laminated with a unidirectional orientation of the optical dye moieties, and
the waveguide is cut out of the polymer laminate such that the orientation of the optical dye moieties is adapted to be the propagation direction, to have a unidirectional periodic domain structure in which domains arranged in a lamination direction perpendicular to the propagation direction are uniformly oriented.

14. The method according to claim 5, wherein the nonlinear optical device is an electro-optical device for modulating an optical wave, having a substrate, the waveguide mounted thereon and apply means for applying an electric field to the waveguide in a direction perpendicular to a propagation direction of the waveguide, the polymer laminate is formed in such a manner that the polymer films are laminated with alternately inverted orientations of the optical dye moieties, and the waveguide is cut out of the polymer laminate such that the orientations of the optical dye moieties of the polymer laminate are adapted to be a propagation direction, to have a bidirectional periodic domain structure in which domains arranged in a lamination direction are periodically inverted.

15. The method according to claim 5, further comprising a feedback step for feeding back the polymer laminate, in which the optical dye moiety is oriented, to the rolling and drawing step to reduce thickness thereof.

16. A method for producing a grating, comprising the steps of:

rolling and drawing a transparent optical material, which has a refractive index distribution, in a direction perpendicular to the refractive index distribution to form a film;

laminating the resultant film to form a laminate; and cutting the laminate to form a grating having a periodic refractive index distribution.

17. The method according to claim 16, wherein the transparent optical material is a plastic fiber in which organic dye is doped in either one of a core portion and a clad portion, whereby the grating has a distributed feedback structure including both the periodic refractive index distribution and a periodic organic dye distribution.

\* \* \* \* \*